(12) United States Patent
Peron et al.

(10) Patent No.: US 12,169,038 B2
(45) Date of Patent: Dec. 17, 2024

(54) CONNECTOR FOR INSERTING INTO A RECEIVING DEPRESSION IN A HOUSING

(71) Applicant: NORMA Germany GmbH, Maintal (DE)

(72) Inventors: Jean-Marc Peron, Guichen (FR); Francois Dolivet, Guichen (FR); Sebastien Paitry, Guichen (FR)

(73) Assignee: Norma Germany GmbH, Maintal (DE)

( * ) Notice: Subject to any disclaimer, the term of this patent is extended or adjusted under 35 U.S.C. 154(b) by 0 days.

(21) Appl. No.: 18/017,543

(22) PCT Filed: Jun. 21, 2021

(86) PCT No.: PCT/EP2021/066862
§ 371 (c)(1),
(2) Date: Jan. 23, 2023

(87) PCT Pub. No.: WO2022/017706
PCT Pub. Date: Jan. 27, 2022

(65) Prior Publication Data
US 2023/0265954 A1   Aug. 24, 2023

(30) Foreign Application Priority Data
Jul. 21, 2020   (DE) ..................... 10 2020 119 170.7

(51) Int. Cl.
*F16L 37/092*   (2006.01)
*F16L 37/098*   (2006.01)

(52) U.S. Cl.
CPC ........... *F16L 37/092* (2013.01); *F16L 37/098* (2013.01)

(58) Field of Classification Search
CPC ..... F16L 37/092; F16L 37/098; F16L 37/084; F16L 37/0885; F16L 2201/10
(Continued)

(56) References Cited

U.S. PATENT DOCUMENTS 3,198,560 A * 8/1965 Collins
5,730,475 A   3/1998 Kargula
(Continued)

FOREIGN PATENT DOCUMENTS

DE   202006019311 U1   4/2008
EP   1936252 B1 *   1/2010
(Continued)

OTHER PUBLICATIONS

EP-1936252-B1—Machine Translation—English (Year: 2010).*
(Continued)

*Primary Examiner* — William S. Choi
(74) *Attorney, Agent, or Firm* — REISING ETHINGTON, P.C.

(57) ABSTRACT

In the case of a connector for inserting into a receiving depression in a housing, having a stub with a flow channel formed therein, the flow channel extending as far as a frontal end of the stub and being surrounded by a lateral surface. Provision is made for a bracing ring to surround the lateral surface. The bracing ring is designed so that, as a result of an axial force acting on the bracing ring and being directed towards the frontal end, the bracing ring can be pushed all the way onto the lateral surface, an external diameter being increased in the process.

14 Claims, 5 Drawing Sheets

(58) Field of Classification Search
USPC .......................................................... 285/3, 4
See application file for complete search history.

(56) References Cited

U.S. PATENT DOCUMENTS

| | | | |
|---|---|---|---|
| 5,911,443 A * | 6/1999 | Le Quere | ........................... 285/3 |
| 8,844,980 B2 * | 9/2014 | Le Quere | |
| 9,599,079 B2 | 3/2017 | Barthel et al. | |
| 9,746,114 B2 * | 8/2017 | Le Quere | |
| 2003/0193190 A1 | 10/2003 | Werth | |
| 2004/0232693 A1 | 11/2004 | Legeay | |
| 2010/0289256 A1 * | 11/2010 | Shumard | |

FOREIGN PATENT DOCUMENTS

| | | |
|---|---|---|
| EP | 2738435 A1 | 6/2014 |
| FR | 2818730 A1 | 6/2002 |
| JP | H0356714 Y2 | 12/1991 |
| JP | H0645753 Y2 | 11/1994 |
| JP | H11505315 A | 5/1999 |
| WO | WO2006000678 A1 | 1/2006 |

OTHER PUBLICATIONS

German Office Action for German Application No. 10 2020 119 170.7 dated Apr. 21, 2021 (4 pages).
International Search Report for International Application No. PCT/EP2021/066862 dated Oct. 4, 2021 (14 pages).
English translation of International Search Report for International Application No. PCT/EP2021/066862 dated Oct. 4, 2021 (2 pages).
Japanese Office Action for Japanese Application No. 2023-504247 dated Feb. 27, 2024 (6 pages).
English Translation of Japanese Office Action for Japanese Application No. 2023-504247 dated Feb. 27, 2024 (8 pages).

\* cited by examiner

CONNECTOR FOR INSERTING INTO A RECEIVING DEPRESSION IN A HOUSING

INTRODUCTION

The disclosure relates to a connector for inserting into a receiving depression in a housing. The disclosure also relates to a coupling having such a connector and having a housing with a receiving depression.

A variety of connectors and couplings for connecting the fluid-channeling components are known. It is usually the case that these are adapted to the relevant fluid, the pressure to be expected, installation conditions and the like. It is known, inter alia, from the automotive industry to prefabricate subassemblies, transport them to a final-assembly line and install them there during the course of final assembly. If such a subassembly has, for example, a connector which fits in a receiving depression, it can sometimes be desirable to position the connector in three dimensions in order to make it easier for the subassembly to be installed.

Known couplings for connecting fluid-channeling components can have an insertable connector and a housing with a receiving depression for receiving the connector. If the connector is merely inserted into the receiving depression and positioned, it is possible for the positioning to change during transportation, as a result of transportation-induced vibrations or the like. For the purpose of arresting the positioning of the connector, it is known for the latter to be secured, following insertion, prior to being rotated. However, this affects the manufacturing in particular of the housing with the receiving depression, since additional rotation-prevention measures have to be taken. Straightforward manufacturing of the housing, which can be done using a lathe, has to be supplemented in this case by further, costly machining steps.

SUMMARY

An object per an embodiment is to provide a connector which can be reliably positioned and can be introduced into a receiving depression in a housing, wherein the housing or the receiving depression can be manufactured as straightforwardly as possible and preferably just by using a lathe.

In the case of a connector for inserting into a receiving depression in a housing, having a stub with a flow channel formed therein, the flow channel extending as far as a frontal end of the stub and being surrounded by a lateral surface, provision is made according to an embodiment for a bracing ring, which can have at least one circumferentially arranged predetermined breaking point at the frontal end, to surround the lateral surface, wherein the bracing ring is designed so that, as a result of an axial force acting on the bracing ring and being directed towards the frontal end, possibly the at least one predetermined breaking point breaks, so that the bracing ring can be pushed all the way onto the lateral surface, an external diameter being increased in the process.

The stub can be, in particular, a tubular element with one or more circular cross sections. The stub serves to be inserted into a complementary receiving depression, so that a fluid from a component connected to the stub can flow into a component connected to the housing. For this purpose, the stub has a flow channel, which extends axially through the stub.

The bracing ring is arranged on the lateral surface at the frontal end. For example, it is possible for just one edge or a narrow peripheral region of the bracing ring to be arranged on the lateral surface, so that the bracing ring is held on the lateral surface, but does not surround the lateral surface to any significant extent. Prior to insertion into the receiving depression, the connector can therefore form a subassembly in which the two components in the form of the bracing ring and the stub are interlinked.

A predetermined breaking point is a specific weakening of a circumferential region of the bracing ring. This makes it possible for the bracing ring to break in a circumferential direction and to be able to increase in diameter.

The stub is preferably conical, at least in certain regions, and therefore widens at least slightly in the axial direction, away from the frontal end. If, as a result of the connector being inserted into the receiving depression, the bracing ring is forced in the direction of the stub by an axial force, it is pushed onto the stub. The widening of the stub gives rise to mechanical stressing in the circumferential direction of the bracing ring, and this results, in particular, in the at least one predetermined breaking point breaking open. Once the at least one predetermined breaking point has broken open, the bracing ring can increase in size and can be pushed onto the lateral surface until it rests fully on the lateral surface. The action of pushing the bracing ring onto the lateral surface allows the maximum external diameter of the lateral surface/bracing ring combination to increase, and this therefore achieves a clamping action of the stub in the receiving depression. The dimensions of the bracing ring, of the stub and of the receiving depression should be coordinated here such that the stub can be pushed all the way into the receiving depression and the desired clamping action can be achieved.

The bracing ring allows the stub to be braced in the receiving depression in a housing, so that a rotationally fixed connection is established between the connector and the housing. The design of the connector means that it is not necessary to implement additional lateral bores, slots or other measures in the receiving depression in order to arrest the connector in a rotationally fixed manner in the receiving depression. This means that the receiving depression can be produced very easily by means of a lathe, and there is no need for any costly additional work to be carried out. It is therefore possible, in particular, for a housing to be produced cost-effectively from a metallic material. The connector, meanwhile, could be produced from a plastic material, and both the stub and the bracing ring could be produced by injection moulding.

In an embodiment, the bracing ring is formed in one piece with the stub and, for the purpose of providing the at least one predetermined breaking point, a transition region between the bracing ring and the stub is weakened. The specific weakening of the transition region means that the bracing ring can easily be detached from the stub under the action of an axial force. One advantage here is that, per this embodiment, when the connector is supplied, the bracing ring is already positioned correctly and ready for use.

It is preferred, per an embodiment, here if the transition region comprises circumferentially spaced-apart crosspieces and/or a reduced material thickness. The bracing ring could be connected to the stub for example by a small number of spaced-apart crosspieces, so that the bracing ring is precisely positioned and only a small compressive force in the axial direction results in the bracing ring being detached. The distance between the crosspieces in the circumferential direction can significantly exceed the width of the crosspieces. Equally, it is also possible to reduce the material thickness in the transition region such that the compressive force is sufficient to detach the bracing ring.

It is preferred, per an embodiment, that the at least one predetermined breaking point has at least one slot, which extends in an axial direction. The slot runs through the entire material thickness of the bracing ring in the radial direction. It can extend along a straight, curved and/or zigzag line, preferably in the axial direction. The slot could be produced as an integral part, for example during injection moulding, or could be realized subsequently by a saw being used to cut into a bracing ring which is manufactured in a closed state. Depending on the dimensioning of the slot, and in particular on its axial extent, it is possible to control the circumferential force which is necessary for breaking purposes and is produced by the axial force at the frontal end.

It is also advantageous, per an embodiment, if the slot is closed at the frontal end. The subassembly made up of the stub and bracing ring therefore has a closed, annular surface and can be inserted into the receiving depression without skewing. Accordingly, in this variant, the slot does not extend in the axial direction all the way through the bracing ring, and there is a connection portion remaining which bridges two adjacent segments of the bracing ring in the circumferential direction and acts as predetermined breaking point. The slot can taper in the direction of the connection portion or widen from the connection portion, in the opposite axial direction, which assists the specific breaking-open operation of the connection portion. The axial force which has to be exceeded in order for the bracing ring to break open is determined by dimensioning of the connection portion and shaping of the slot.

For the purpose of widening the bracing ring, it is expedient for the lateral surface to taper, at least in certain regions, in the direction of the frontal end. When the bracing ring is pushed on in the opposite axial direction, its inner surface is therefore widened, and this results, in particular, in the at least one predetermined breaking point breaking open, so that the bracing ring can be pushed further onto the lateral surface. The stub is therefore conical, at least in certain regions.

It is also possible for the bracing ring to be designed in the form of a separate component. In this case, the bracing ring could be formed from a different, for example somewhat softer, material than the stub. This improves the function of the at least one predetermined breaking point, and the shape accuracy of the stub can be maintained.

It is preferable, per an embodiment, the case that at least one sealing ring is incorporated in the inside of the bracing ring. When the stub is pushed into the receiving depression, it is possible for sealing to take place at the same time, and the separate step of introducing the sealing rings when the connector is being assembled can be done away with.

It is advantageous here, per an embodiment, if the at least one sealing ring is axially adjacent to the frontal end of the stub or is spaced apart axially therefrom. The stub assists the operation of introducing the at least one sealing ring, since the bracing ring can be pushed onto the lateral surface and the at least one sealing ring is held by the frontal end of the stub. The at least one sealing ring can be dimensioned such that, when the connector has been inserted into the receiving depression, the at least one sealing ring is pushed in a flush manner, and by way of a small axial compressive force, into a sealing seat.

It is additionally preferred, per an embodiment, if at least one radially resilient latching element is arranged on the lateral surface for arresting in a circumferential groove in the receiving depression. The connector can thus be arrested, in a pushed-in state, in the axial direction. The at least one latching element is arranged such that, at a predetermined insertion depth, the latching element snap-fits radially into a circumferential groove in the housing. All that is therefore required for the purpose of establishing the connection between the connector and the receiving depression is for the connector to be inserted.

The disclosure, per an embodiment, also relates to a coupling having a connector according to the preceding part of the description and having a housing with a receiving depression, wherein the receiving depression is designed to complement the connector. The housing can be produced from a material different to that of the connector. It can be recommended, for example, to combine the housing made of a metallic material with a connector made of a plastic material. The configuration according to an embodiment gives rise to an easy-to-manufacture housing of which the essential features for the connection to the connector can be produced by a lathe.

It is preferred, per an embodiment, if the receiving depression has a bracing portion with an inner surface and a radial shoulder, wherein the inner surface has a diameter which corresponds with an external diameter of the bracing ring when the latter is relieved of stressing. The shoulder allows the bracing ring to strike against the same and be retained firmly in place. The operation of the connector being pushed in the direction of the receiving depression then results in the stub and the bracing ring moving relative to one another. The diameter ratio can give rise to a wedge effect for bracing the stub in place when the stub is introduced to the extent where it reaches the envisaged depth.

In addition, adjacent to a frontal end of the housing, the receiving depression could have a circumferential groove for receiving radially resilient latching elements. As mentioned above, additional axial fixing can be thereby achieved. The use of a circumferential groove allows the latching elements to be latched in in any desired rotational position.

BRIEF DESCRIPTION OF THE FIGURES

Further features, details and advantages of embodiments of the disclosure can be gathered from the wording of the claims and also from the following description of exemplary embodiments with reference to the drawings, in which:

DETAILED DESCRIPTION

Figure 1:
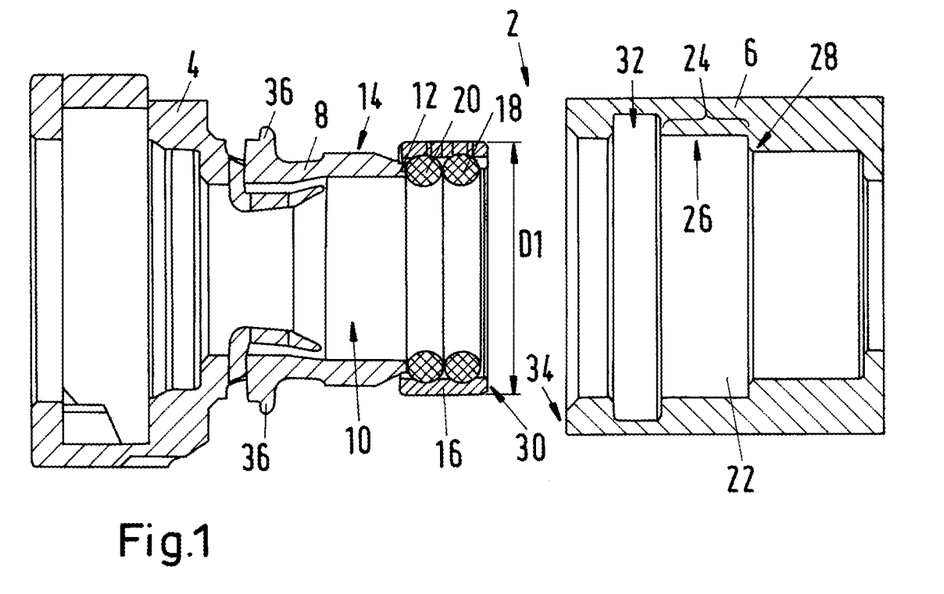
FIG. 1 shows a side section of a coupling with the connector and housing separated from one another.

FIG. 1 shows a coupling 2 having a connector 4 and a housing 6. The connector 4 has a stub 8, in which a flow channel 10 is formed. The stub 8 has a frontal end 12, from which a fluid which flows through the flow channel 10 is supplied. A lateral surface 14 surrounds the flow channel 10.

A bracing ring 16 is arranged, by way of a periphery, on the lateral surface 14, at the frontal end 12. The bracing ring 16 can be a separately produced component, or is manufactured so as to be integral with the stub 8. In the latter case, it could be expedient to provide only very fine connecting bridges between the bracing ring 16 and the stub 8, so that the bracing ring 16 can be detached from the stub 8 under the action of a relatively small axial force. As will be explained hereinbelow, the bracing ring 16 has at least one circumferential predetermined breaking point, which is not shown in this illustration.

When relieved of stressing, as shown here, the bracing ring 16 has an external diameter D1. By way of example two sealing rings 18 and 20 are incorporated in the inside of the bracing ring 16. The sealing ring 20 is directly adjacent to the frontal end 12 of the stub 8.

A receiving depression 22 is provided in the housing 6. This receiving depression is formed so as to complement the stub 8. A bracing portion 24 is provided therein, and has an inner surface 26 and a radial shoulder 28. The shoulder 28 serves to come into surface-area contact with a frontal end 30 of the bracing ring 16. An internal diameter of the inner surface 26 here is approximately identical to D1, or exceeds D1 by a customary fit dimension.

Also provided is a circumferential groove 32, which is adjacent to a frontal end 34 of the housing. The stub 8 has radially resilient latching elements 36, which, once the stub 8 has been pushed all the way into the receiving depression 22, latch with the circumferential groove 32. The circumferential groove 32 here extends over the entire circumference of the receiving depression 22, so that the rotational positioning of the stub 8 has no bearing on the function of the latching-in action of the latching elements 36.

Figure 2:
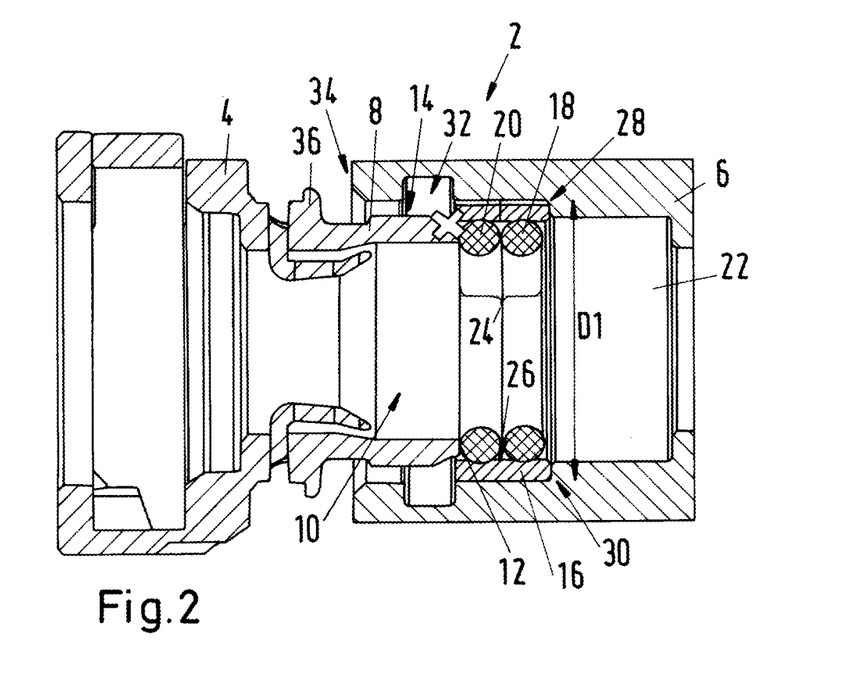
FIG. 2 shows a side section of the coupling with the connector inserted some way into the housing.

FIG. 2 shows the operation of the stub 8 being pushed into the receiving depression 22. In the state which is illustrated in FIG. 2, the frontal end 30 of the bracing ring 16 is in contact with the shoulder 28. If the bracing ring 16 is connected to the stub 8 to some extent at certain locations, this connection can be released by the stub 8 being pushed in slightly. As will be illustrated hereinbelow, the action of an axial force on the bracing ring 16 also results in at least one predetermined breaking point being broken open, so that the bracing ring 16 can be pushed further onto the lateral surface 14.

Figure 3:
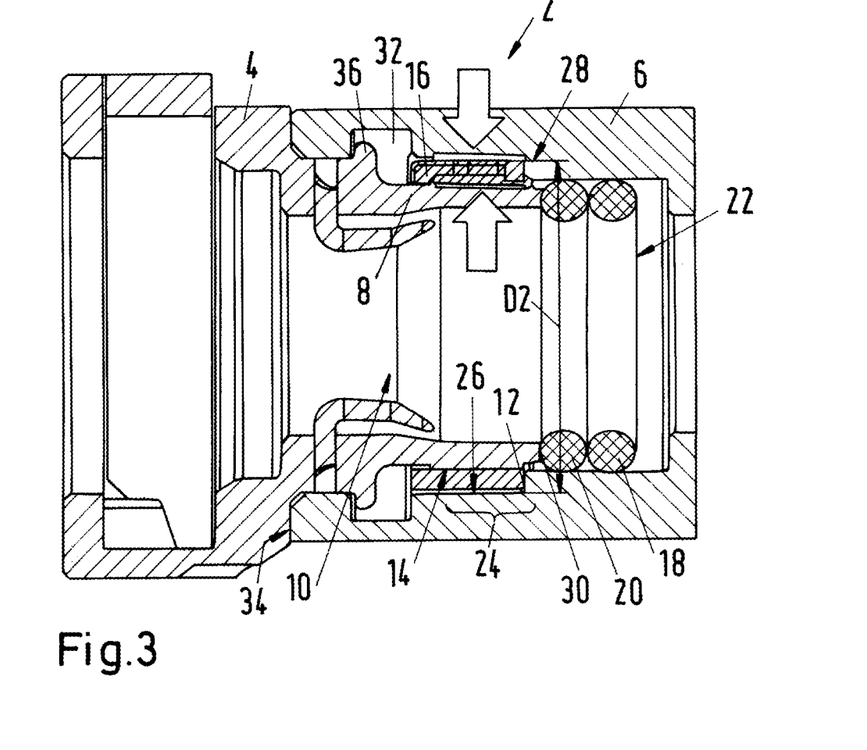
FIG. 3 shows a side section of the coupling with the connector inserted all the way into the housing.

As can be seen in FIGS. 1 to 3, the stub 8, or the lateral surface 14, is slightly conical in some locations, so that the diameter of the lateral surface 14 widens slightly from the frontal end 12. Accordingly, the external diameter of the bracing ring 16 increases from D1 to D2 as a result of the bracing ring being pushed onto the stub 8. This can be seen in FIG. 3. There, the bracing ring 16 has been pushed far onto the lateral surface 14 and has an external diameter D2, which is greater than the diameter D1, when stressing has been relieved, from FIG. 1. Since the cross section of the receiving depression 22 is completely filled, at least locally, and the material of the bracing ring 16 is subjected to pressing in the radial direction, a wedge effect is produced between the inner surface 26 and the lateral surface 14. The bracing ring 16 therefore functions as a kind of wedge, and the stub 8 is seated in a rotationally fixed manner in the receiving depression 22.

Figure 4:
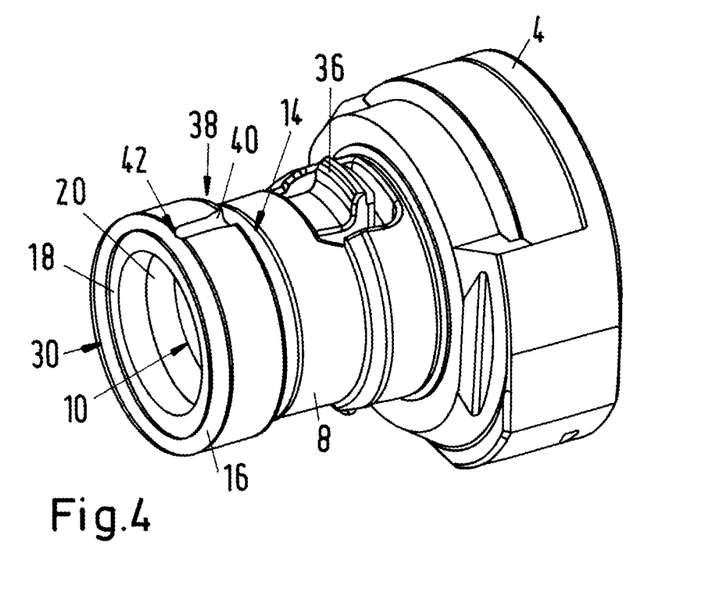
FIG. 4 shows a perspective view of the connector.

FIG. 4 shows a perspective view of the connector 4. Here, the bracing ring 16 has been fitted onto the stub 8, so that the stub 8 and the bracing ring 16 form an interlinked subassembly which is easy to assemble and handle. A predetermined breaking point 38 in the form of a slot 40 is provided on an outer surface of the bracing ring 16. The slot is closed at the frontal end 30. A narrow crosspiece 42 is provided, by way of example, for this purpose, the slot 40 not extending in the radial and axial directions through the crosspiece. In addition to this, the slot 40 is configured such that it widens in the axial direction from the frontal end 30, so that the mechanical stressing which is necessary for breaking-open purposes is concentrated in the region of the crosspiece 42. When the bracing ring 16 is pushed onto the stub 8, that region of the slot 40 which is directed away from the crosspiece 42 is therefore pulled apart and the crosspiece 42 breaks. In the example shown, the connector 4 has two diametrically opposite latching elements 36, which can latch in the circumferential groove 32.

Figure 5:
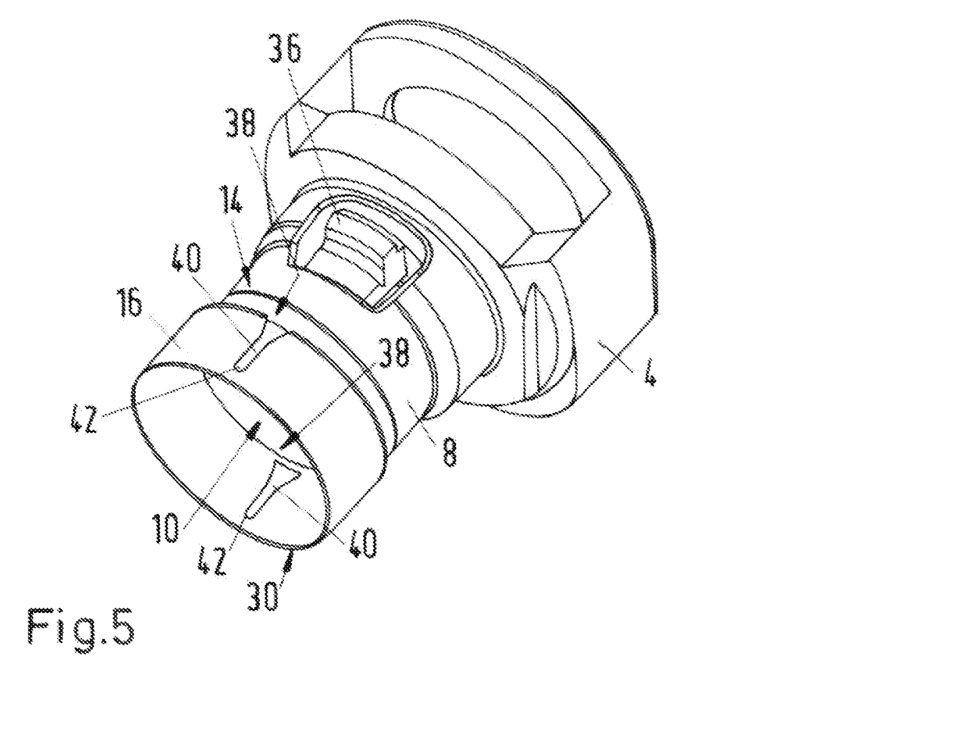
FIG. 5 shows a side section of the connector without any sealing rings.

As FIG. 5 shows, it is also possible to provide two predetermined breaking points 38 in the form of two slots 40, which are arranged diametrically at opposite circumferential locations of the bracing ring 16.

Figure 6:
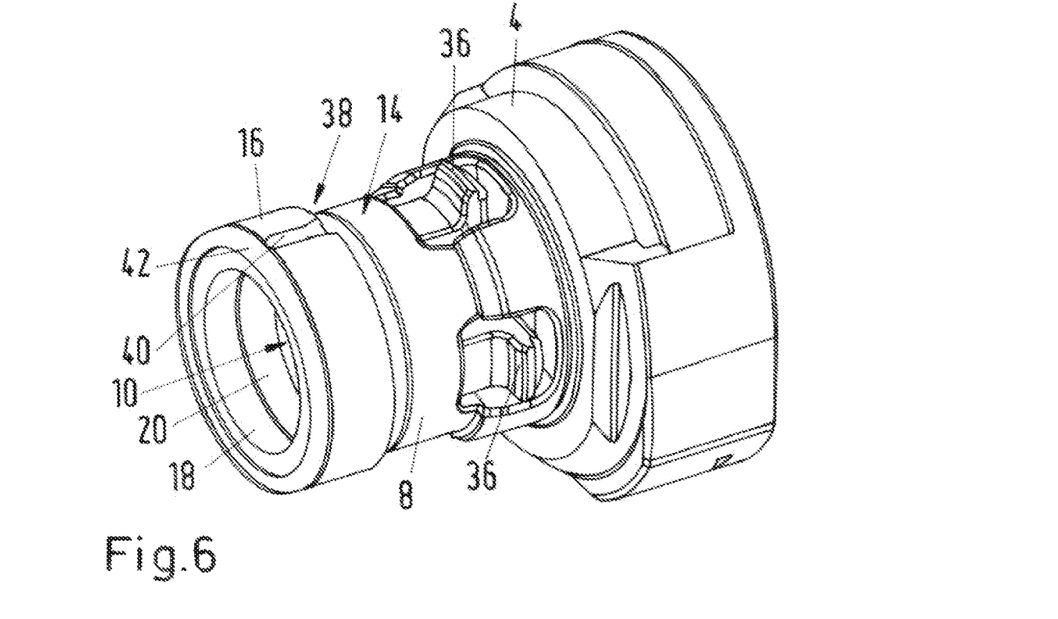
FIG. 6 shows a perspective view of the connector with the bracing ring broken open.

FIG. 6 shows a modified variant of the connector 4 with a single predetermined breaking point 38, but four circumferentially distributed latching elements 36. This makes it possible for greater axial forces to be absorbed in the latched-in state.

Figure 7:
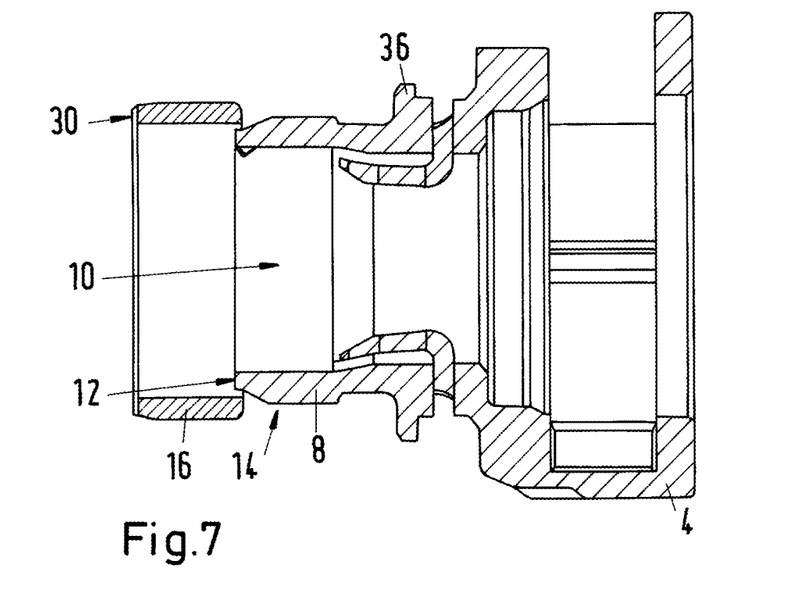
FIG. 7 shows a perspective view of the connector with two predetermined breaking points in the bracing ring.

FIG. 7 shows, once again, a side section of the connector 4, this time without the sealing rings 18 and 20 and in a delivery state, in which part of the bracing ring 16 rests on the lateral surface 14. Directly adjacent to this, the stub 8 widens, so that the internal diameter, and consequently also the external diameter, of the bracing ring 16 increases.

Figure 8:
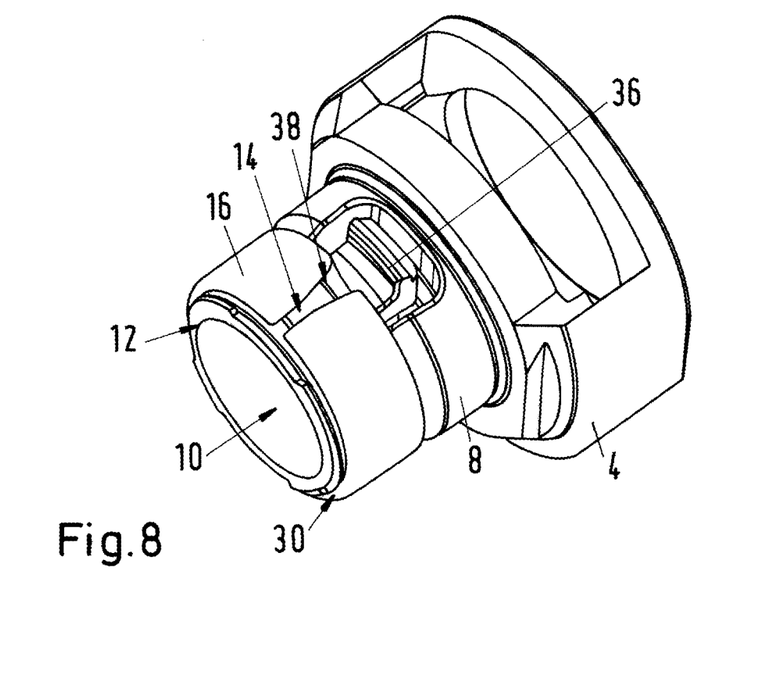
FIG. 8 shows a perspective view of the connector with four latching elements.

Furthermore, FIG. 8 shows the bracing ring 16 in the fully pushed-on state, wherein, in this case, the predetermined breaking point 38 has been broken open. The frontal end 12 of the stub 8 projects out of the bracing ring 16. At the breaking point, it can be seen that the bracing ring 16 has widened to a considerable extent, which results in the aforementioned wedge effect when the connector 4 fits in the receiving depression 22.

Figure 9:
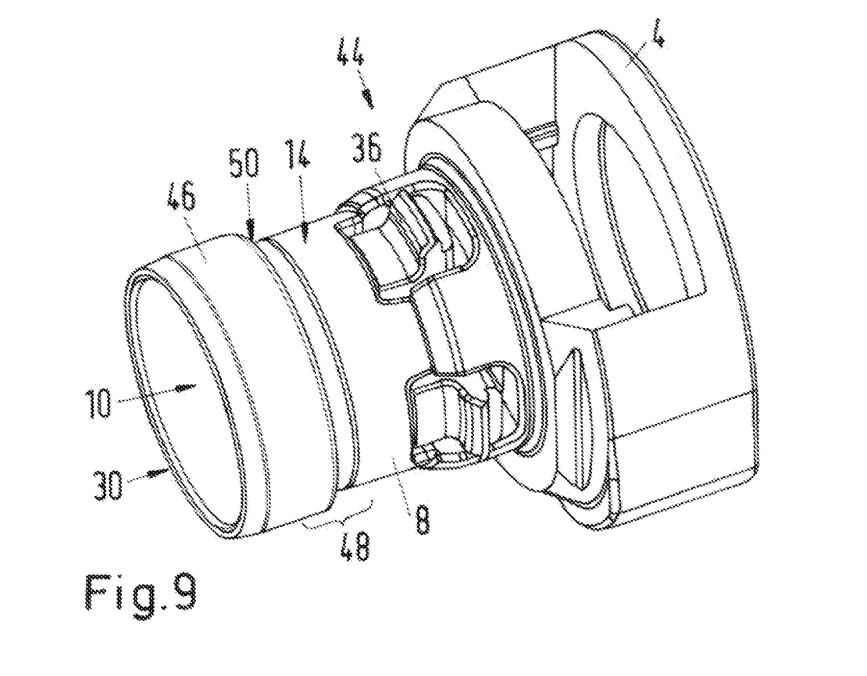
FIGS. 9 and 10 show two perspective views of a modified connector.
Figure 10:
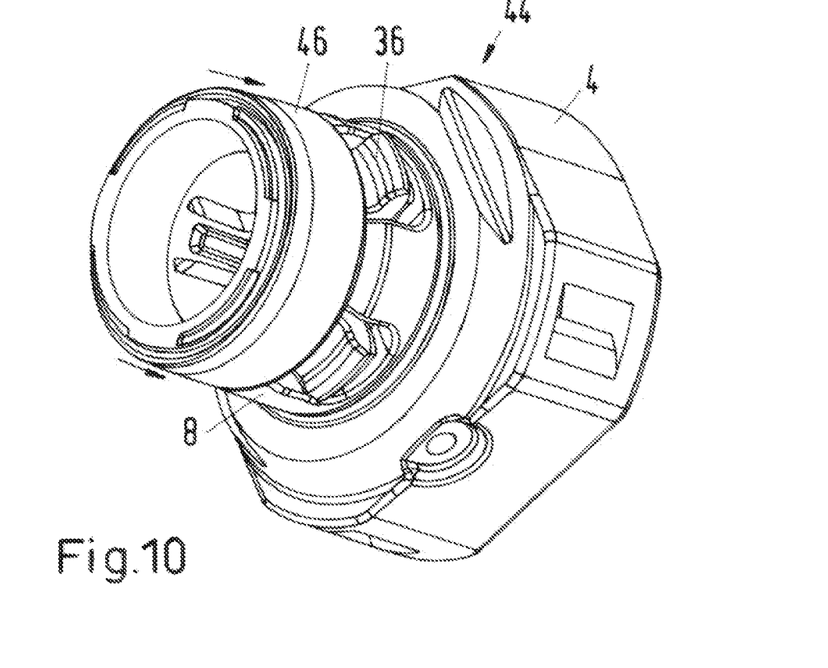

FIGS. 9 and 10 show a modified connector 44, which has a slightly different bracing ring 46, which is formed in one piece with the stub 8. In a transition region 48, a predetermined breaking point 50 has been formed by weakening of the material. This can be realized by the arrangement of circumferentially spaced-apart crosspieces, which run between the bracing ring 46 and the stub 8, or by a reduced material thickness. In FIG. 9, the bracing ring 46 is attached to the frontal end 12 of the lateral surface 14, and is ready for use. As a result of an axial compressive force acting on the bracing ring 46, the crosspieces can rupture and allow the bracing ring 46 to shift. This leads to the illustration in FIG. 10, in which the bracing ring 46 has been shifted in the direction of the latching elements 36 and has been widened to some extent.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

The invention is not restricted to one of the embodiments described above, but can be modified in various ways.

All of the features and advantages which can be gathered from the claims, the description and the drawing, including structural details, spatial arrangements and method steps, may be essential to the invention both individually and in a wide variety of different combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

2 Coupling
4 Connector
6 Housing
8 Stub
10 Flow channel
12 Frontal end
14 Lateral surface
16 Bracing ring
18 Sealing ring
20 Sealing ring
22 Receiving depression
24 Bracing portion
26 Inner surface
28 Frontal shoulder
30 Frontal end of the bracing ring
32 Circumferential groove
34 Frontal end of the housing
36 Latching element
38 Predetermined breaking point
40 Slot
42 Crosspiece
44 Connector
46 Bracing ring
48 Transition region
50 Predetermined breaking point
D1 External diameter while relieved of stressing
D2 External diameter while subjected to stressing

The invention claimed is:

1. A coupling having a connector for inserting into a receiving depression in a housing, and having the housing with the receiving depression,
the connector having a stub with a flow channel formed therein, the flow channel extending as far as a frontal end of the stub and being surrounded by a lateral surface, wherein a bracing ring surrounds the lateral surface at the frontal end,
wherein the bracing ring is designed and constructed so that, as a result of an axial force acting on the bracing ring and directed towards the frontal end, the bracing ring can be pushed all the way onto the lateral surface and an external diameter being increased, establishing a rotationally fixed connection between the connector and the housing,
wherein the receiving depression is designed and constructed to complement the connector.

2. The coupling according to claim 1, wherein pushing the bracing ring onto the lateral surface gives rise to a wedge effect between the lateral surface and an inner surface of the receiving depression.

3. The coupling according to claim 1, wherein the receiving depression has a bracing portion with an inner surface and a radial shoulder,
wherein the inner surface has a diameter which corresponds with an external diameter of the bracing ring when the bracing ring is in an unstressed state.

4. The coupling according to claim 1, wherein, adjacent to a frontal end of the housing, the receiving depression has a circumferential groove for receiving radially resilient latching elements.

5. The coupling according to claim 1, wherein the bracing ring has at least one circumferentially arranged predetermined breaking point,
wherein the bracing ring is designed and constructed so that, as a result of an axial force acting on the bracing ring and directed towards the frontal end, the at least one predetermined breaking point breaks, so that the bracing ring can be pushed all the way onto the lateral surface, an external diameter being increased in the process.

6. The coupling according to claim 5, wherein the bracing ring is formed in one piece with the stub and, for the purpose of providing the at least one predetermined breaking point, a transition region between the bracing ring and the stub is weakened.

7. The coupling according to claim 6, wherein the transition region comprises circumferentially spaced-apart crosspieces, a reduced material thickness, or both.

8. The coupling according to claim 5, wherein the at least one predetermined breaking point has at least one slot, which extends in an axial direction.

9. The coupling according to claim 8, wherein the slot is closed at the frontal end.

10. The coupling according to claim 5, wherein the lateral surface tapers, at least in certain regions, in the direction of the frontal end.

11. The coupling according to claim 10, wherein the at least one sealing ring is axially adjacent to the frontal end of the stub or is spaced apart axially therefrom.

12. The coupling according to claim 5, wherein the bracing ring is designed and constructed in the form of a separate and discrete component.

13. The coupling according to claim 5, wherein at least one sealing ring is incorporated in the inside of the bracing ring.

14. The coupling according to claim 5, wherein at least one radially resilient latching element is arranged on the lateral surface for arresting in a circumferential groove in the receiving depression.

* * * * *